United States Patent [19]
Jaedicke et al.

[11] 3,887,313
[45] June 3, 1975

[54] VULCANIZING DEVICE FOR OPEN HOLLOW BODIES, ESPECIALLY TOROIDAL RAW PNEUMATIC TIRES

[75] Inventors: Roland Jaedicke, Hemmingen-Westerfeld; Ulfert Schmidt, Hannover, both of Germany

[73] Assignee: Continental Gummi-Werke Aktiengesellschaft, Hannover, Germany

[22] Filed: Oct. 25, 1973

[21] Appl. No.: 409,581

[52] U.S. Cl. ............... 425/42; 425/33; 425/43
[51] Int. Cl. ............................................ B29h 5/02
[58] Field of Search ............ 425/31, 32, 33, 35, 40, 425/41, 42, 43, 49, 50, 51, 52, 53

[56] References Cited
UNITED STATES PATENTS

| | | | |
|---|---|---|---|
| 1,893,762 | 1/1933 | DeMattia | 425/43 |
| 2,341,026 | 2/1944 | Eakin | 425/50 |
| 2,670,499 | 3/1954 | Weigold | 425/53 |
| 2,846,722 | 8/1958 | Soderquist | 425/42 |
| 2,858,566 | 11/1958 | Brundage | 425/33 |
| 2,997,740 | 8/1961 | Soderquist | 425/32 |
| 3,153,263 | 10/1964 | Mallory et al. | 425/32 |
| 3,443,280 | 5/1969 | Hugger | 425/43 X |
| 3,632,712 | 1/1972 | Miller | 425/40 X |

*Primary Examiner*—J. Howard Flint, Jr.
*Attorney, Agent, or Firm*—Walter Becker

[57] ABSTRACT

A vulcanizing device for open hollow bodies, especially toroidal raw pneumatic tires, which have the required heat conveyed thereto by a heated mold forming the outer contour of the tire to be vulcanized and also by a heat carrying medium which under vulcanizing pressure is conveyed through a minimum of nozzles into the hollow chamber of the hollow body to be vulcanized.

7 Claims, 4 Drawing Figures

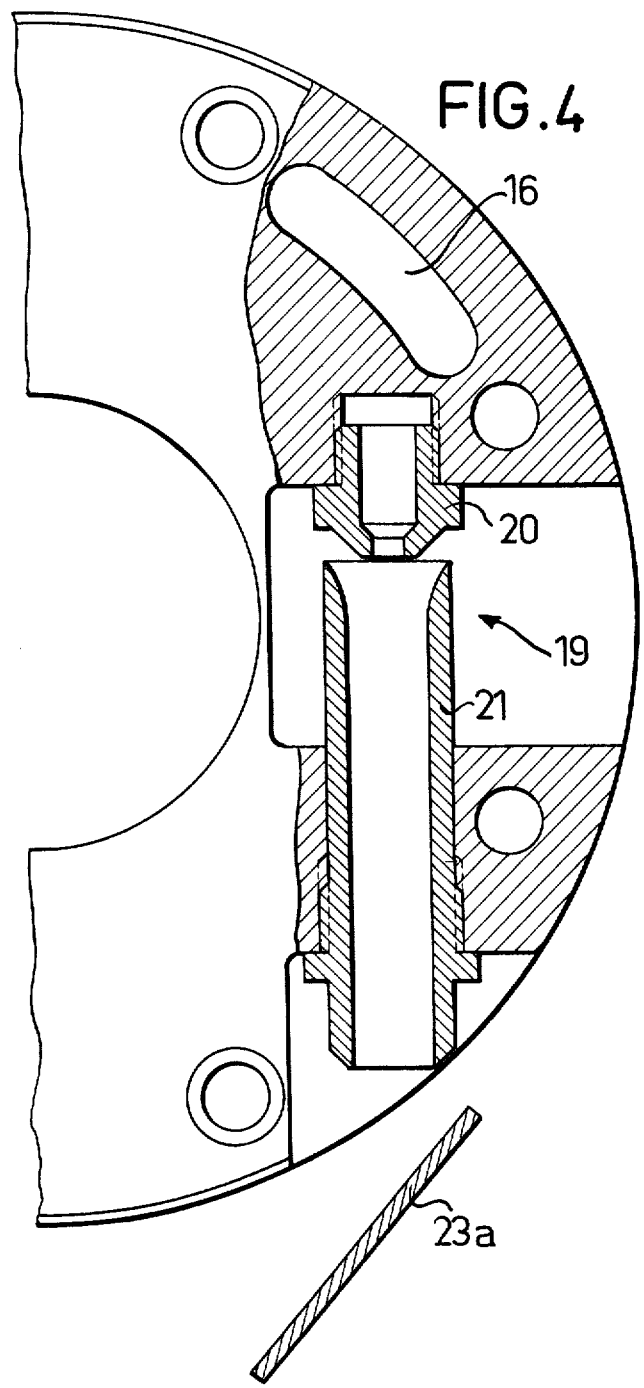

VULCANIZING DEVICE FOR OPEN HOLLOW BODIES, ESPECIALLY TOROIDAL RAW PNEUMATIC TIRES

The present invention relates to curing and vulcanizing devices for hollow bodies, especially toroidal raw pneumatic tires. Vulcanizing devices for this purpose are known according to which the medium which passes through the hollow chamber of the hollow body to be vulcanized is by a smaller or greater number of guiding surfaces directed in such a way that the medium supplies the heat transfer surfaces with the required quantity of heat in as uniform a manner as possible. If only so much heated medium is passed through the hollow chamber as is necessary for transferring the required heat, numerous tests have shown that a uniform temperature in the individual zones of the article to be vulcanized cannot be realized in spite of various positions of the guiding surface or surfaces. A satisfactory distribution of the temperature is possible only when considerably increasing the required quantity of heat (according to experience, a ten-fold increase in the quantity of heat is necessary) which, however, is economically not feasible. Consequently, it was necessary with heretofore known devices of the type involved to put up with temperature differences and thus with different degrees of curing or vulcanization in the finished article.

It is, therefore, an object of the present invention to provide an improved curing and vulcanizing device for hollow bodies, which will bring about a better and improved distribution of the heat carrying medium in the hollow chamber of the hollow body than was heretofore obtainable.

This object and other objects and advantages of the invention will appear more clearly from the following specification, in connection with the accompanying drawings, in which:

FIG. 4 shows the device according to FIGS. 1 and 2 with one injector.

Figure 1:
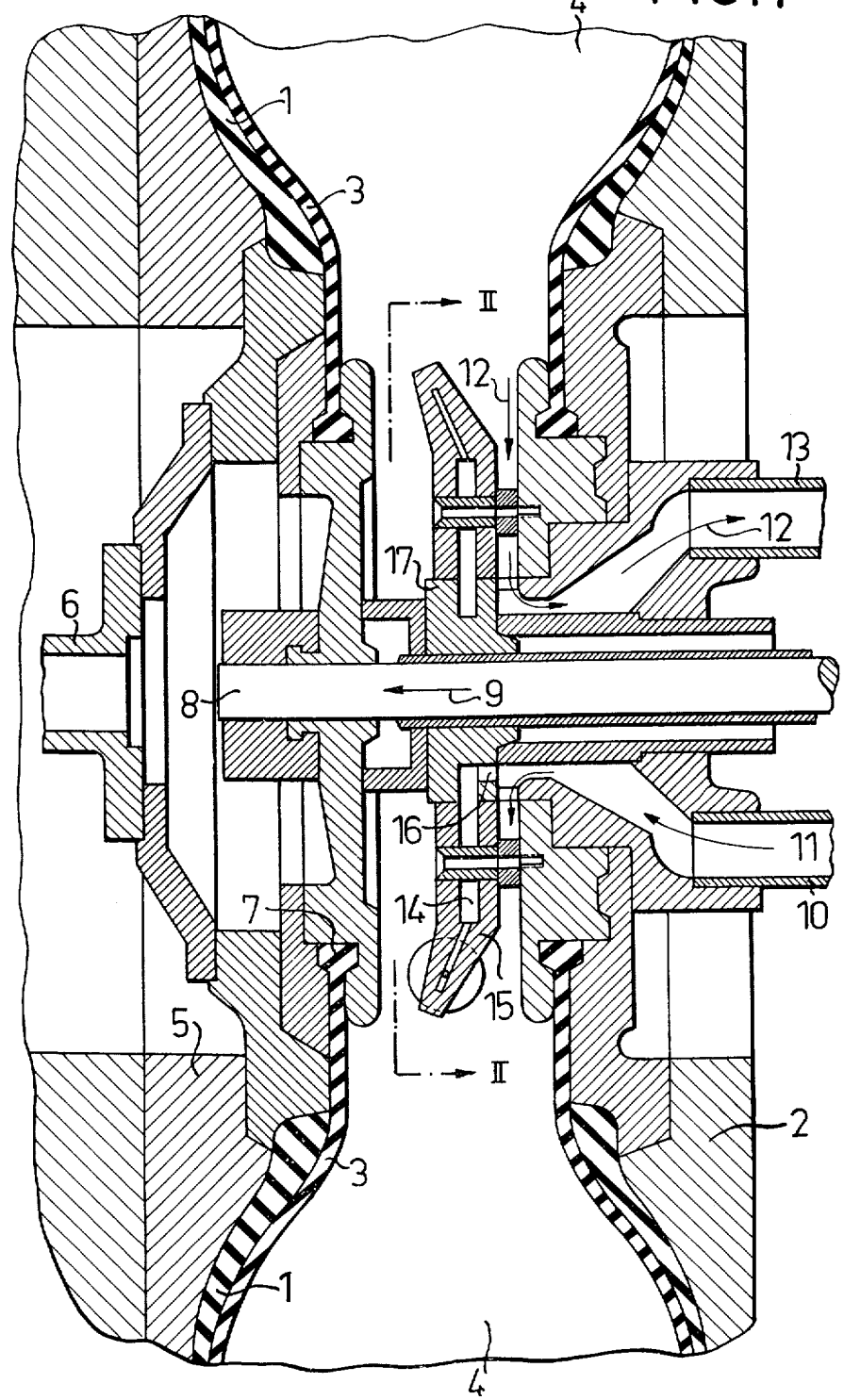
FIG. 1 represents an axial section through a vulcanizing device according to the invention with four injectors, said section being taken along the line I—I of FIG. 2.

The vulcanizing device according to the present invention is characterized primarily in that as small a number of nozzles as possible is arranged as means for introducing the heating medium into the hollow chamber of the hollow body to be vulcanized. Due to this arrangement, surprisingly a very uniform temperature distribution will be realized. The medium entering the hollow chamber through the nozzle or nozzles is better distributed and is more uniformly distributed than has heretofore been possible by means of guiding surfaces or baffle plates. In connection with the present invention it has also been found that the distribution of the heating medium is all the more intensive the smaller the number of nozzles employed. With one and the same required quantity of heat, the distribution and turbulence is consequently better when using one nozzle than when using three nozzles in conformity with the reduced cross section. With simple geometric forms of the hollow chamber, especially with geometric forms having round walls, if possible, only one nozzle is selected for introducing the entire necessary quantity of heating medium, whereas with large hollow chambers or hollow chambers which are somewhat complicated as to shape, correspondingly more nozzles have to be employed. The location and the arrangement of the exit opening for the medium from the hollow chamber does not influence the effectiveness of the nozzles with regard to a uniform distribution of the heat quantities.

On the other hand, the effectiveness of the nozzle is considerably improved when the nozzle or nozzles is, or are followed by a substantially cylindrical mixing tube. This is due to the fact that the medium drawn in by the nozzle and subjected to turbulence in the mixing pipe is on its way back to the nozzle already slightly cooled and is again intermixed with the freshly entering medium whirled into the hollow chamber so that the total quantity of medium leaving the mixing pipe generate as great a turbulence as possible and a simultaneous heat transfer.

It has proved particularly advantageous so to distribute and arrange the nozzle or nozzles that a circulation of the medium is created in the above mentioned hollow chamber. In such an instance, the circulating medium which repeatedly passes through the mixing pipe of the nozzle brings about a further distribution of the introduced heat.

When the nozzle or nozzles is, or are, so distributed and oriented in an annular hollow chamber that the medium circulates along the annular hollow chamber, excellent results are obtained for specifically shaped hollow spaces while the tangential arrangement of the nozzles is most favorable.

Referring now to the drawings in detail, a raw tire 1 to be vulcanized is inserted into a mold 2 and has a heating bellows 3 introduced into the hollow chamber of the tire. The hollow chamber 4 received during the vulcanization heating medium under pressure which is preferably in liquid condition. A mold cover 5 may, by means of a device 6 which is only partially illustrated, lifted for opening the mold 2. For purposes of pulling the heating bellows out of raw tire 1, the bead 7 of the heating bellows 3, which bead 7 is facing toward the mold cover 5, may, by means of the piston rod 8 of a non-illustrated hydraulic lifting cylinder, be lifted in the direction of the arrow 9 to such an extent that the heating bellows 3 is smaller than the inner opening of the raw tire 1. If the piston rod 8 is lowered against the direction of the arrow 9 and if simultaneously the medium present in the hollow chamber 4 is subjected to pressure, the heating bellows 3 slips into the raw tire 1 so that the position illustrated in FIG. 1 will again be obtained. The medium is passed through a feeding line 10 over a path indicated by the arrow 11 into the hollow chamber 4 and leaves the latter along a path which is indicated by the arrow 12 and from which the medium finally passes into the discharge 13.

Figure 2:
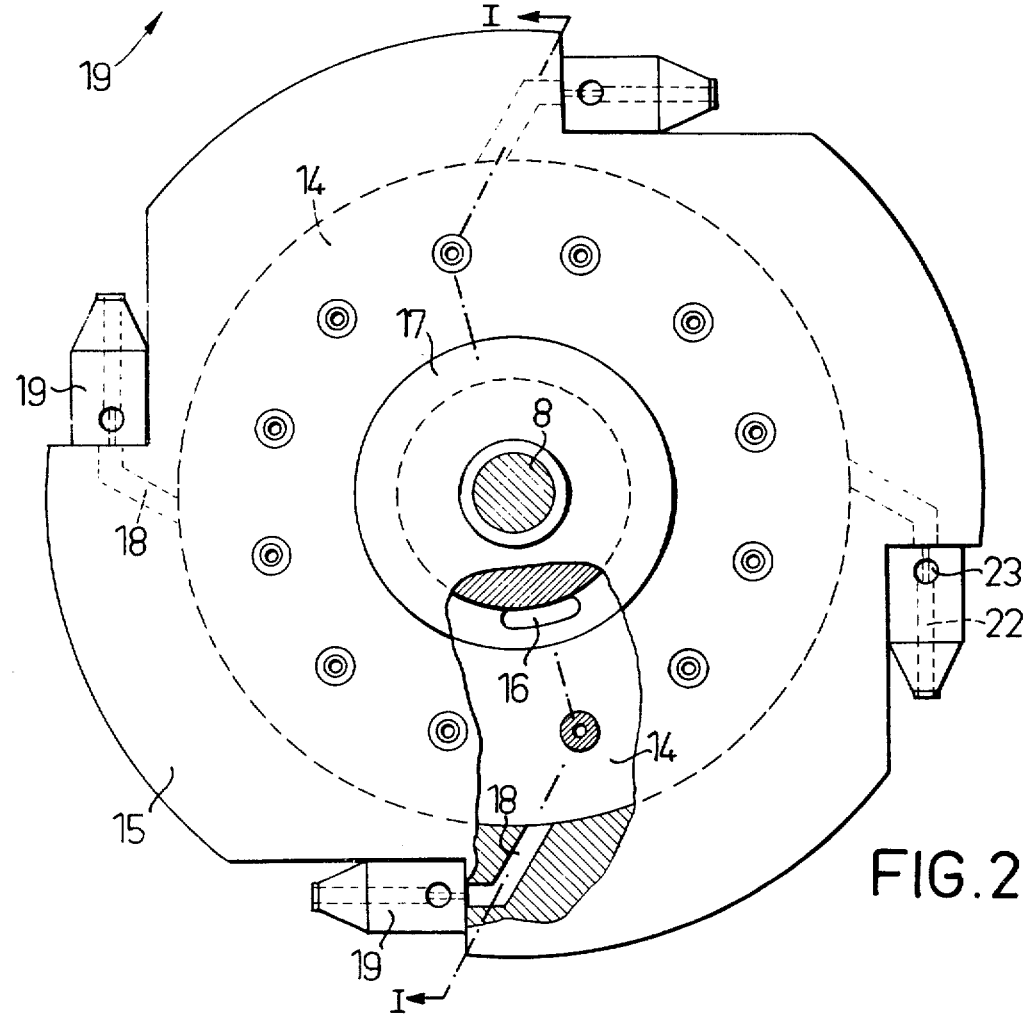
FIG. 2 illustrates a section taken along the line II—II of FIG. 1.

As will be seen from FIG. 1, the medium which is conveyed through the feeding line 10 is passed into an annular chamber 14 of a disc 15 which disc is reached by the medium through bores 16 of the disc carrier 17. As will be evident from FIG. 2, the medium passes from the annular chamber 14 through substantially radial passages 18 which pass into injectors 19 offset with regard to each other by 90°.

Figure 3:
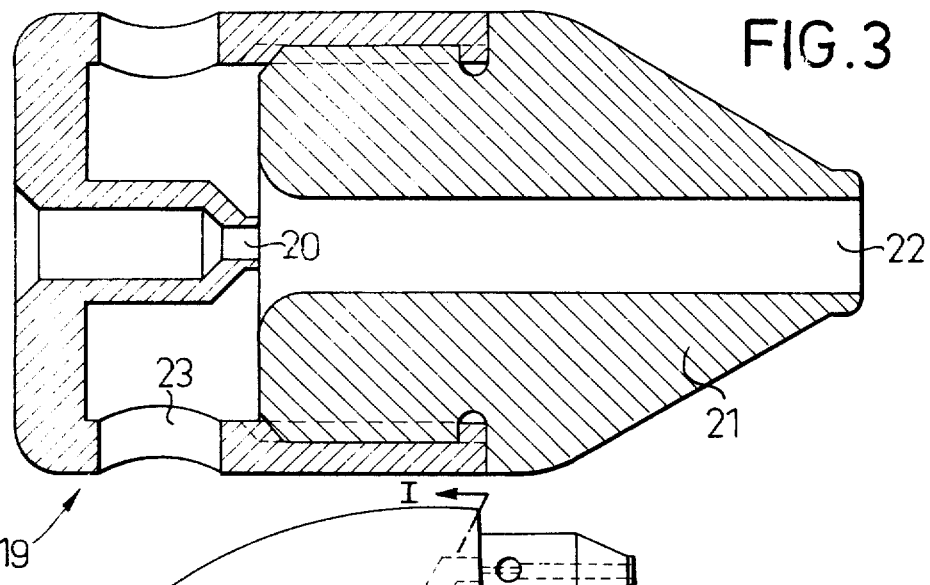
FIG. 3 represents an axial section through an injector, but on a larger scale than that of FIGS. 1 and 2.

According to FIG. 3, such injector comprises substantially a nozzle 20 which forms the smallest cross section for the circulation of the medium and thus generates the highest flow velocity. The high flow velocity created in the nozzle 20 generates primarily the movement in the hollow chamber 4 which movement is necessary for the uniform distribution of the temperature.

For purposes of creating the injector effect, the nozzle 20 is followed by a mixing pipe 21, the cylindrical inner chamber 22 of which widens in the vicinity of the nozzle 20 in a funnel-shaped manner. The jet of the medium leaving the nozzle 20 draws through openings 23 the medium already in the hollow chamber 4 and while intermixing with the heat enriched medium again imparts movement on said heat enriched medium which enters through the nozzle 20.

Inasmuch as the injectors 19 are tangential to an imaginary circular line in the hollow chamber 4 and generate a tangential jet, the medium flowing around in the annular hollow chamber 4 will act upon the inner surface of the heating bellows 3 everywhere with a uniformly tempered medium so that a uniform heat supply is effected toward the raw tire to be vulcanized. It will also be avoided that the degrees of vulcanization will on comparable areas of the tire which are dependent on the thickness of the tire be uniformly above or below the normal degree of vulcanization. In order to avoid that the medium circulating in the hollow chamber 4 will in view of the centrifugal force and also in view of gravity forces form superimposed layers, the injectors 19 are arranged along a diameter of the hollow chamber 4 which diameter is as small as possible, because in this way the emitted jet will also in the tangential direction intersect the direction of movement of the circulating medium. Moreover, in this arrangement the injectors will interfere the least with the pulling out of the heat bellows 3 from the raw tire 1 after the vulcanization has been completed and the tire is finished.

As mentioned above, for the effectivenes of the heating device according to the present invention, it is advantageous to combine the nozzle cross section required for introducing the necessary quantity of water to a minimum of nozzles, possibly to one nozzle because the thus generated turbulence impulse will then be greatest. In the above mentioned example according to the invention four turbulence elements are selected in order to illustrate the principle and the guiding of the medium in an example. However, it should be noted that the effectiveness of the temperature distribution with such flow favorable hollow chamber 4 is better with a single injector 19 according to FIG. 4. It will be appreciated that the medium which enters through the bore 16 will when omitting the annular chamber 14 reach the nozzle directly which is followed by the mixing pipe 21.

It will be seen that the most favorable position of the whirling or turbulence elements may be different depending on the shape of the hollow chamber. The medium which enters the mixing pipe 21 through the opening 23 may also be introduced by suction pipes from any desired position of the hollow chamber 4 which suction pipes are connected to the openings 23. This may be advantageous with certain shapes of hollow chamber 4. If, by means of the injector 19 in a specifically shaped hollow chamber or by a necessary unfavorable position, for instance, in the center, no satisfactory circulation of the medium can be realized, the jet of the injector 19 is deviated by an additional guiding plate 23 or a plurality of such guiding plates.

It is, of course, to be understood that the present invention is by no means limited to the specific showing in the drawings, but also comrpises any modification within the scope of the appended claims.

What we claim is:

1. A curing device for open hollow bodies, especially toroidal raw pneumatic tires, which includes in combination: a mold, mold receiving means for receiving a mold for a hollow body to be cured, hollow heat carrying means movable selectively into and out of a hollow body inserted into the interior of the mold in said mold receiving means and adapted in its interior to receive and carry a heating substance, conveying means associated with said heat carrying means for conveying a heating substance into said heat carrying means when the latter is inserted into the hollow body to be cured, said conveying means including nozzle means forming the inner end of said conveying means, said nozzle means including housing means defining a chamber and provided with opening means communicating with the interior of said heat carrying means, tubular means having an inlet communicating with said chamber and having an outlet communicating with the interior of said heat carrying means, and a nozzle having an inlet communicating with said conveying means and having a mouth adjacent said inlet of said tubular means, whereby heating substance passing from said nozzle into said tubular means draws heating substance from said chamber into said tubular means while intermixing with said last mentioned heating substance.

2. A device in combination according to claim 1, in which a portion of said heat carrying means defines a hollow annular chamber within the region of said nozzle so distributed and oriented in said hollow chamber as to be operable when discharging a heating substance to impart thereupon a circulation within said hollow chamber.

3. A device in combination according to claim 2, in which said nozzle is so distributed and arranged in said annular chamber as to cause the heating substance to move along the wall of said hollow chamber.

4. A device in combination according to claim 2, in which said nozzle is tangentially arranged with regard to a circular line within said annular chamber.

5. A device in combination according to claim 4, in which said circular line is closer to the inner confinement contour of said annular chamber than to the outer confinement of said annular chamber.

6. A device in combination according to claim 4, which includes annular disc means arranged centrally within said device and in part defining said conveying means, said nozzle being arranged at the periphery of said disc means.

7. A device in combination according to claim 4, in which said conveying means are at least in part formed by tubular means.

* * * * *